United States Patent
Haustein et al.

(10) Patent No.: US 8,521,922 B2
(45) Date of Patent: Aug. 27, 2013

(54) INPUT/OUTPUT (I/O) PATH SELECTION BASED ON WORKLOAD TYPES

(75) Inventors: Nils Haustein, Mainz (DE); Thorsten Krause, Kisslegg (DE); Ulf Troppens, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 13/346,330

(22) Filed: Jan. 9, 2012

(65) Prior Publication Data

US 2012/0179846 A1 Jul. 12, 2012

(30) Foreign Application Priority Data

Jan. 10, 2011 (EP) .................................... 11150460

(51) Int. Cl.
*G06F 3/00* (2006.01)
*G06F 13/00* (2006.01)

(52) U.S. Cl.
USPC ............. 710/38; 710/2; 710/5; 710/8; 710/32

(58) Field of Classification Search
None
See application file for complete search history.

(56) References Cited

U.S. PATENT DOCUMENTS

| | | | |
|---|---|---|---|
| 6,145,028 A | 11/2000 | Shank et al. | |
| 7,032,041 B2 | 4/2006 | Sahara et al. | |
| 7,134,040 B2 | 11/2006 | Ayres | |
| 2009/0307341 A1* | 12/2009 | Minato | 709/223 |

* cited by examiner

*Primary Examiner* — Scott Sun
(74) *Attorney, Agent, or Firm* — Griffiths & Seaton PLLC (57) ABSTRACT

Various embodiments for an Input/Output (I/O) path selection based on workload types are provided. A port workload controller is adapted to control the workload types of ports for accessing a storage device. A storage access command is received by the port workload controller from an application being executed on a virtual server on a physical server. The workload types related to the storage access command are determined. Storage access paths between the application and the storage device having the same workload types as the determined workload types related to the storage access command are determined. Storage access paths mapping data that is controlled by the port workload controller is used. A selected storage access path is selected out of the determined storage access paths having the least utilization. The storage device is accessed via the selected one of the plurality of storage access paths.

21 Claims, 6 Drawing Sheets

INPUT/OUTPUT (I/O) PATH SELECTION BASED ON WORKLOAD TYPES

PRIORITY CLAIM

This application claims priority to European Patent Application No. 11150460.1, filed Jan. 10, 2011, which is hereby incorporated by reference in its entirety.

BACKGROUND OF THE INVENTION

1. Field of the Invention

The present invention relates to computers, and more specifically, to a Input/Output (I/O) path selection based on workload types.

2. Description of Related Art

Today, strong growth of data in enterprises and other types of organizations may require storage devices with larger and larger capacities. Traditionally, structured and unstructured data are managed by different kind of storage technologies. The same applies for transactional data and, e.g., archived data. On one hand there are relatively small amounts of data to be accesses randomly, whereas on the other hand, a large amount of consecutive data may be retrieved. The price erosion of magnetic disks makes it increasingly easier to manage all sorts of data on the same type of physical device. Another aspect is an even more advanced database technology that not only allows an easy management of relational data but also the management of unstructured data like voice, image or video information. These days, magnetic disks—or hard disks or hard files—may also be used to store large repositories of archived data. Given the growing amount of data storable on a magnetic disk, the type of data stored on one magnetic disk becomes much more diverse. Many different types or data may be stored on the same magnetic disk, or simply disk. Comparable aspects apply also to file servers and tape systems.

On the other side, different types of data may require different access optimization techniques in order to guarantee an optimal overall performance of a complete system being comprised of an application, a server, I-O adapters and disks. Workload types have a strong influence on an optional overall performance, e.g., random access to a disk may require another type of optimization compared to a sequential access to larger, consecutive chunks of data.

A problem with mixed workloads using the same path from an application to a disk is related to performance degradation of the path. The problem may be nailed down to the fact that a port of an I/O adapter may not have mixed workload types. Several approaches have been followed in order to compensate the problem of mixed workloads or performance degradation. Document U.S. Pat. No. 7,032,041B2 discloses a method for determining a workload type from an I/O request and subsequently appointing an appropriate path based on whether the I/O request is a sequential request or a random request. Document U.S. Pat. No. 7,134,040B2 discloses a method and a system for selecting a path to a device to use when sending data requests to the device.

However, because of the above-discussed drawbacks and available technology, there may be a need for an optimized access to magnetic disks from applications generating different types of workloads and using modern infrastructure components that utilize existing hardware in an optimal way.

SUMMARY OF THE DESCRIBED EMBODIMENTS

The present invention addresses the drawbacks and available technology by a method for a path selection between an application and a storage device as well as by a storage path selection engine according to the independent claims.

According to one embodiment, a method for a path selection between an application and a storage device may be provided. The method may comprise providing a port workload controller being adapted to control workload types of ports for an access to the storage device. The method may also comprise receiving a storage access command by the port workload controller from the application being executed on a virtual server on a physical server and determining the workload type related to the storage access command. Moreover, the method may comprise determining a plurality of, in particular all, storage access paths between the application and the storage device having the same workload type as the determined workload type related to the storage access command, using storage access path mapping data—in particular organized in one or more tables—controlled by the port workload controller. Furthermore, the method may comprise selecting a selected storage access path out of the determined storage access paths having the least utilization, and accessing the storage device via the selected storage access path.

In another embodiment, a storage path selection engine for a path selection between an application and a storage device may be provided. The storage path selection engine may comprise a providing unit adapted to provide a port workload controller being adapted to control workload types of ports for an access to the storage device and a receiving unit adapted to receive a storage access command by the port workload controller from the application being executed on a virtual server on a physical server. The storage path selection engine may also comprise a first determining unit adapted to determine the workload type related to the storage access command and a second determining unit adapted to determine a plurality of storage access paths between the application and the storage device having the same workload type as the determined workload type related to the storage access command, using storage access path mapping data controlled by the port workload controller. Moreover, the storage path selection engine may comprise a section unit adapted to select a selected storage access path out of the determined storage access paths having the least utilization and an accessing unit adapted to access the storage device via the selected storage access path.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF CERTAIN EMBODIMENTS

As will be described below, it may be noted that the port workload controller that may be adapted to control workload types of ports, may in particular be configurable. Such configurability may allow determining a workload type for a port of a controller at boot time of the virtual or physical server. The configurability may allow a manual or automatic configuration of the ports. It may also be possible to re-configure the workload type of ports during a normal operation of the virtual and/or physical server. The access command to the storage device may in particular be a read, write, update or delete operation. It should also be noted that an access to a storage device via a port may be blocked, if the actual workload type does not match the workload type configured for the specified port.

In the context of this application, the following principle terms are used:

Application—The term application may denote an executable program typically running on top of an operating system that serves as an intermediate between the application code and the physical hardware of a computer. An application may be a data processing application such as a data base application, or a data storage application such as a backup application. In regards to read and write I/O characteristics, single applications may require different types of workload types, in particular sequential I/O workloads or random I/O workloads. This may be the case for backup applications which usually may have a database related random workload and a storage pool related sequential workload.

Storage device—The term storage device may denote a device allowing long term storage of data in contrast to a main memory of a computer. In particular, magnetic disk may be used as storage devices. However, beside magnetic disks also solid state disks or other types of long term storage media may be used, e.g., compact disks (CD), Blu-Ray-Disks, DVD, magnetic tapes, holographic storage systems or file servers. In the context of this application, the exemplary term disk may also include other storage devices like tapes, CDs, DVDs, tapes, etc., where appropriate.

Port—The term port may denote a connection on a network adapter of either a physical server or a storage device connectable to a network. The storage system may comprise a plurality of storage devices that may jointly be connected to a network via one or more adapters. A server network adapter may be implemented as a single-port adapter or part of a multi-port adapter. A hypervisor may map all physical ports to virtual server ports or only a subset of all physical ports. There may be a plurality of server network adapters in one physical server. Likewise, a storage system network adapter might be a single-port server network adapter or a multi-port server network adapter. There may be a plurality of storage system network adapters in one storage system.

Physical server—The term physical server may denote a computer system configured as a server system, also named host.

Virtual server—The term virtual server may denote a software implementation of a machine or a computer (i.e., a physical server) that executes programs like a physical machine. In this application, the term virtual server may denote a so called system virtual machine which may provide a complete system platform which may support an execution of a complete operating system and applications. Such a virtual server may comprise virtual ports for I/O.

Hypervisor—The term hypervisor may denote a program also called virtual machine monitor, and may allow running concurrently multiple virtual servers with operating systems on one physical server. The hypervisor may present to the guest operating systems a virtual operating platform and may monitor the execution of the guest operating systems. Multiple instances of a variety of operating systems each running on a virtual server may share the virtualized hardware resources. Hypervisors may be installed on the physical server hardware whose only task is to run guest operating systems. One of the tasks of a hypervisor may be a mapping of virtual ports of a virtual server or virtual machine to a physical port on a physical adapter of the physical server. In particular, in modern data centers and cloud computing environments, virtualization may be used as one technique to increase the utilization of physical servers. Examples of hypervisors may be Xen, KVM, PowerVM, z/VM or VMware. Hypervisors may be used to optimize the usage of physical servers by running several virtual servers on one physical server. In context of this patent application, a hypervisor may also denote multi-tenancy techniques such as SELinux and Linux containers which allow running applications of multiple tenants within the same operating system instance whilst the operating system resources and applications of one tenant are protect against unauthorized access of another tenant.

Storage access path—The term storage access path may denote a path required to access data on a storage medium, e.g., a disk, a tape, a Blu-Ray disk, a CD or DVD, from an application running on a virtual server. The virtual server may run on a hypervisor, which may be executed on a physical server. A complete path may start within the application. Other elements of the access path may be a virtual port of the virtual server, a physical port of a host network adapter installed in the physical server, one or more networks, a port of a network controller of a storage system, a storage controller controlling more than one physical disk. The path may end at a physical disk or another storage medium storing the required data. The path may also be seen as starting at the disk. The direction may not matter. The disk may be a single hard disk drive, or may be a group of hard disk drives or RAID (Redundant Array of Independent Disks) arrays. The disk may also be represented by a logical drive whereby multiple logical drives may reside on one group of disks. Disks in general are organized in block addresses under which the data is written and can be addressed during read.

It may be noted that in the context of this patent application a storage access path may be defined as a way between a program or application running in a virtual server on a hypervisor on a physical server.

Port workload controller—The term port workload controller may denote a controller for managing different workload types of ports being used as part of a storage access path.

Workload type—The term workload type may denote different types of workloads, in particular sequential I/O or random I/O.

Sequential I/O—The term sequential I/O (input/output) may denote that an application may issue read or write commands which may address continuous block addresses on a disk.

Random I/O—The term random I/O may be characterized by commands addressing non-continuous but random block addresses on a storage devices, e.g, a disk. It may be noted that a given application may also generate both types of workload such as a backup application, which usually may use a data base generating a random workload and storage pools generating a sequential workload.

Least utilization—This term may relate to a comparison of workloads of a port or an access path to a storage device. If, e.g., one port may handle five access commands and another port may handle only three access commands in parallel, the port having less parallel access commands to handle may be seen as the one having the least utilization. The utilization may also be related to a throughput measurement.

The above-described method for a path selection may provide a couple of advantages. In particular, the method may improve the overall performance of storage I/O from applications running on a virtual server. The access to storage systems may be optimized in that only workload of the same type may be used by a given port of an adapter on a given path from a software application in a virtual server that runs on a hypervisor on a physical server. There may be no longer disturbing workloads because random access to storage devices may not be intermixed with sequential access to storage devices. Prior art may teach a device driver which may send random I/O and sequential I/O to different server network adapters. This I/O may be restricted to the boundary of a single, physical or virtual server, which does not require a hypervisor. Such lack of I/O workload separation for multiple virtualized servers may impact the capability of efficient sharing of server network adapters in virtualized server environments. Cloud computing customers using multiple virtual servers on one physical server connected via one or more networks to one or more storage system may suddenly perceive a decrease of their random workload which may cause to miss their own performance level agreements.

In one embodiment of the method, the method may comprise a hypervisor being executed on the physical server and may comprise the port workload controller. In particular, the hypervisor may be adapted to create an environment for the virtual server the application is using for its execution.

In another embodiment of the method, the storage access paths may comprise each at least one element out of the group comprising a virtual port of the virtual server, a server network controller, a network, a storage network controller, a storage controller. The above listed elements may typically be used between an application and a physical disk. An access command may access a virtual port of the virtual server—potentially supported by an operating system running on the virtual server and providing access to the ports of a machine. The hypervisor may map the virtual port to a physical port of an I/O adapter of the physical server. The access command may be routed through a network, in particular through a storage area network (SAN) or any other kind of local or wide area network. At another location in the network, a storage system may be attached. That may be an individual magnetic disk with a network controller and a storage controller. It may also be a networked storage system comprising a network adapter with several physical ports. The storage controller may then be coupled between the network controller of the storage system and the magnetic disk.

In yet another embodiment of the method, the server network controller may comprise at least one physical port. Typically, network controllers may comprise more than one physical port. In one advantageous embodiment of the method, the storage network controller may comprise at least one physical port. This port may represent another side of the storage command access path that may be directed to the storage side.

In again another embodiment of the method, the storage device may be comprised in a storage system having a plurality of storage devices. As already discussed, this may allow the inventive concept to be used in an environment in which not only single magnetic disks may be used but complete storage sub-systems.

One embodiment of the method may comprise the feature that the port workload controller may maintain an index of a plurality of server network controllers. In particular, the port workload controller may maintain a list of all available server network adapters and potentially also of all ports of the various server network adapters as well as their individual workload type.

The method—in one embodiment—may also comprise signalling a permitted workload type to device drivers of the virtual server. This may help in an optimized allocation of resources, in particular ports for different types of workloads. If a controlling element of a virtual port may be informed about a permitted workload type, e.g. random vs. sequential, no intermixed workload types may be assigned. A path may be selected that no intermixing of workload type on ports of adapters may happen.

The method may—in another embodiment—comprise blocking an access to a port of the server network adapter for a selected storage access path if the workload type may not match the permitted workload type. Such a mechanism may be used not to intermix workload types on a port of the server network adapter. As discussed above, during boot-time, or installation, or configuration time of the physical server, a specific workload type may be assigned to a specific port of each of a plurality of server network adapters. The blocking may help to maintain the support of a specific workload type for a port of a specific adapter. A signalling of allowed workload types of ports of server network adapters to device drivers of virtual ports of the virtual servers allows a proper path selection of the source of the path planning, e.g., in multi-pass device drivers of the virtual servers. The port workload controller effects such a signalling.

One embodiment of the method may comprise synchronizing updates of permitted workload types for a port of a server network controller. The synchronization may comprise:
  setting a permitted workload type of the port to a disabled-pending status in the storage access port mapping data,
  signalling the disabled-pending status to the device drivers of each virtual server,
  waiting for a predetermined time such that issued storage device access commands are completed,
  writing a new workload type for a port to the storage access path data, and
  signalling the writing of the workload type to the device drivers of each virtual server.

This sequence of steps may be used during a re-configuration of control data of the port workload controller. Thus, at any time during an operation of the physical server and potentially during setups or shutdowns and removal of virtual servers, the workload configuration for the ports of the network adapters of the physical server may be redefined.

It should be noted that embodiments may take the form of an entire hardware implementation, an entire software embodiment or an embodiment containing both, hardware and software elements. In a preferred embodiment, the invention may be implemented in software, which includes, but is not limited to, firmware, resident software and microcode. A preferred embodiment may be implemented as part of a hypervisor. In one embodiment, a data processing program for execution in a data processing system may be provided comprising software code portions for performing the method, as described above, when the program is run on a data processing system. The data processing system may be a computer or computer system attached to the asset management system via communication means.

Furthermore, embodiments may take the form of a computer program product, accessible from a computer-usable, or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the drawings will be given. All illustrations in the drawings may be schematic. Firstly, a block diagram of the method for a path selection between an application and a storage device will be described. Afterwards, several system components and related elements will be described. Finally, a flow chart for configuring the path selection engine may be illustrated.

Figure 1:
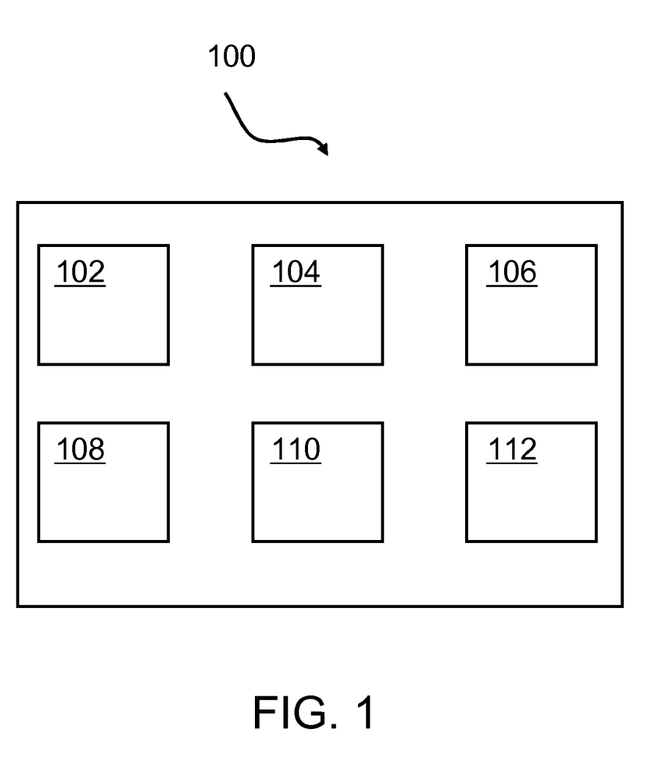
FIG. 1 may show a block diagram of an embodiment of the inventive method.

FIG. 1 may show a block diagram of an embodiment of the inventive method 100 for a path selection between an application 204, 206, 340, 342 and a storage device 228, 230, 232. The method 100 may comprise providing, block 102, a port workload controller 370 being adapted to control workload types of ports 352, 354, 356, 358 for an access to the storage device 228, 230, 232, receiving a storage access command by the port workload controller 370 from the application 204, 206, 340, 342 being executed on a virtual server 344, 346 on a physical server 202, and determining the workload type related to the storage access command. Furthermore, the method 100 may comprise determining a plurality of storage access paths between the application 204, 206, 340, 342 and the storage device 228, 230, 232 having the same workload type as the determined workload type related to the storage access command, using storage access path mapping data controlled by the port workload controller 370, selecting a selected storage access path out of the determined storage access paths having the least utilization as well as accessing the storage device 228, 230, 232 via the selected storage access path.

Figure 2:
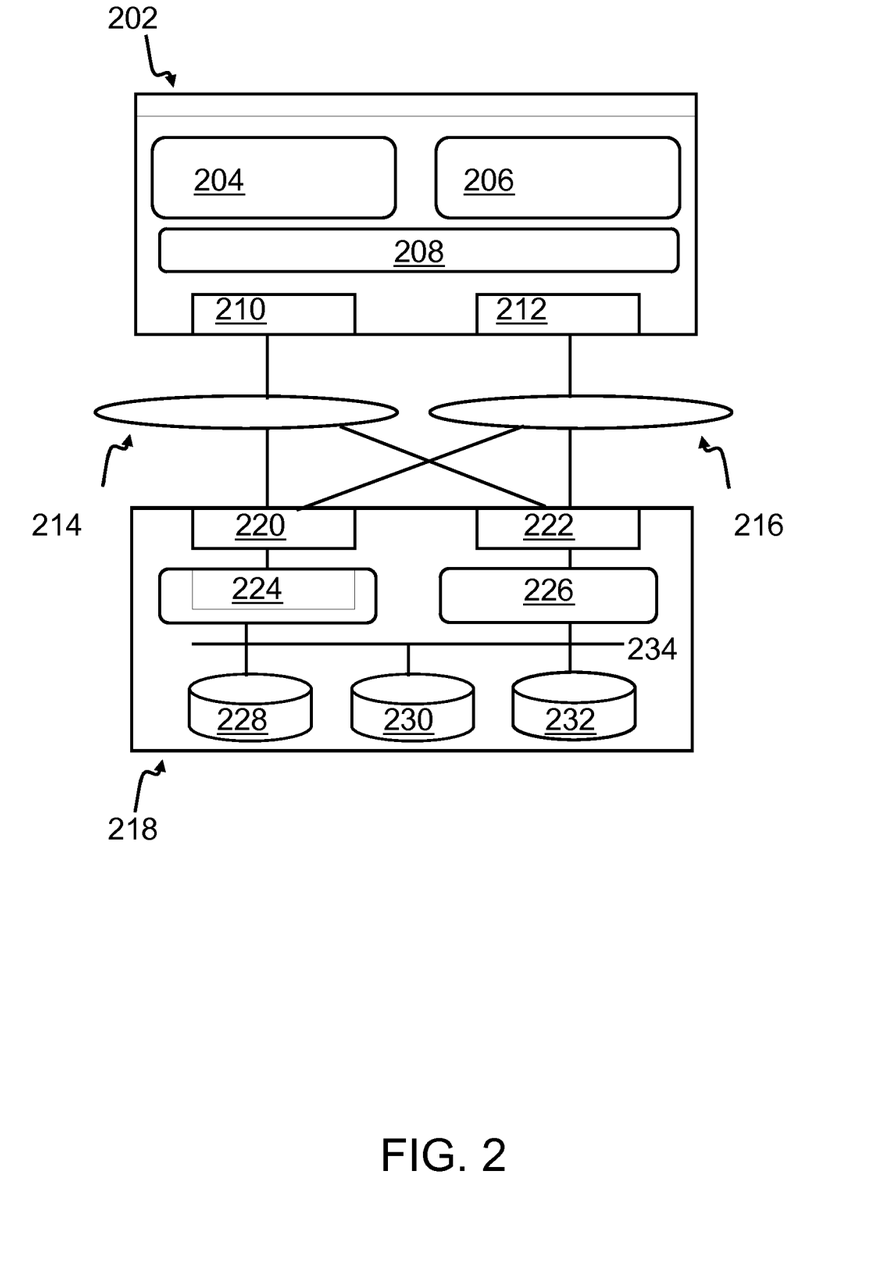
FIG. 2 shows a conventional configuration of storage access paths.

FIG. 2 shows a conventional configuration for storage access paths. A server 202 may run an operating system that may provide one or more device drivers 208 instrumental in accessing physical hardware of the server 202, in particular to server network adapters 210, 212 and or storage devices. These server network adapters may allow an access to one or more networks 214, 216, like, e.g., local area networks, wide area networks or storage area networks. Also mobile networks may be used. Also attached to the network, there may be a storage system 218 provided. The storage system 218—or storage sub-system—may have one or more storage system network adapters 220, 222. One or more controllers 224, 226 in the storage system may control an operation of one of more magnetic disks 228, 230, 232 via a local bus system 234. An application 204 or 206 may access the magnetic disks via several paths as may be discussed below.

Figure 3:
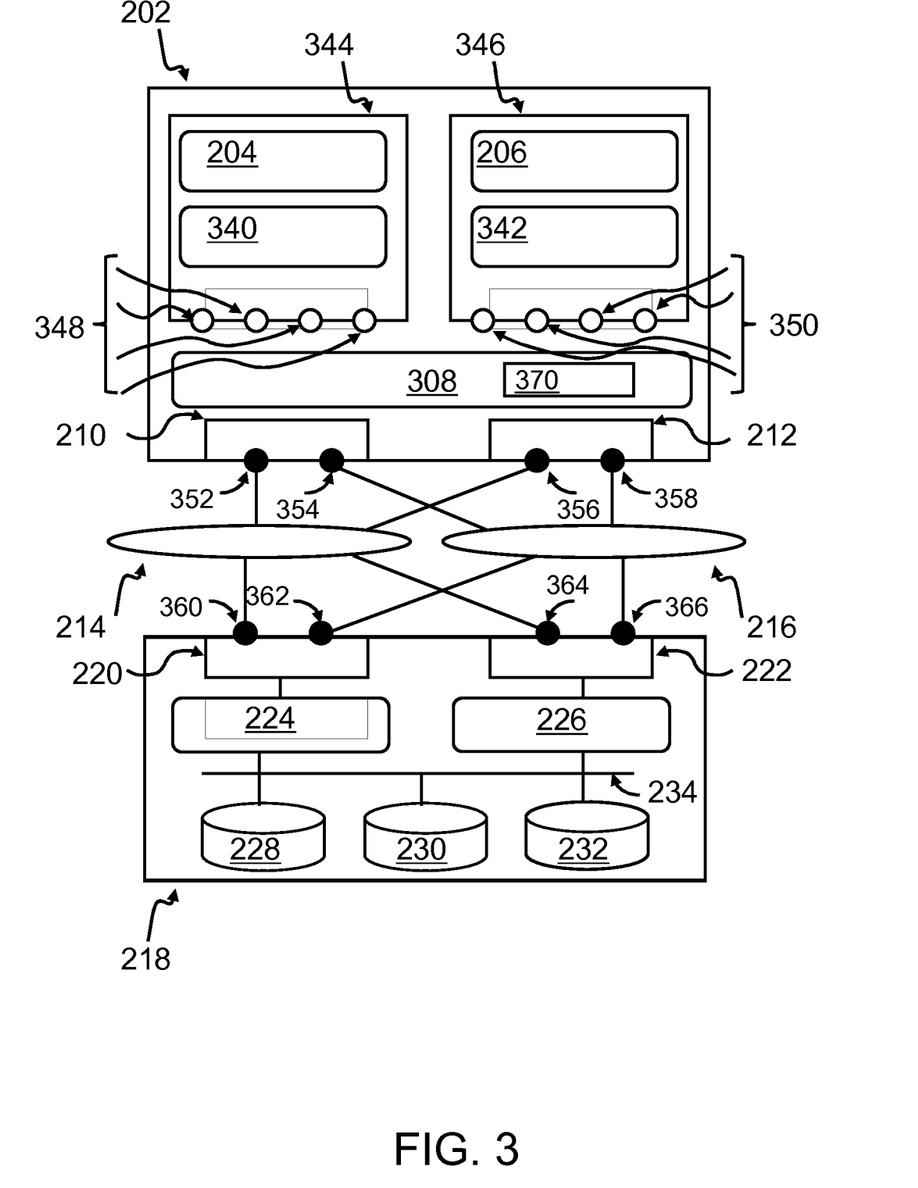
FIG. 3 illustrates an embodiment of a usage of the inventive storage path selection engine.

FIG. 3 illustrates an embodiment of a usage of the inventive storage path selection engine that may be enabled to perform the inventive path selection method. FIG. 3 shows many of the elements already shown in FIG. 2. Reference numeral for similar elements may be identical between FIG. 2 and FIG. 3.

In addition to FIG. 2, in FIG. 3, the environment for the applications 204, 340, 206, 342 is more complex. The applications 204, 340, 206, 342 run in a virtualized environment. Virtual servers 344 and 346 may emulate a physical server 202 using a hypervisor 308. Also shown are virtual ports 348 and 350 for the virtual servers 344, 346, respectively. The virtual servers may also be named virtual machines or guests. It may be noted that also an operating system for each virtual server 344, 346 may be required to run the applications 204, 340, 206, 342. The applications access for I/O, in particular for an access to external storage, virtual ports 348 and 350. The hypervisor 308—as known by a person skilled in the art—may be instrumental in mapping the virtual port identifiers to identifiers of ports 352, 354, 356 and 358 on server network adapters 210 and 212. The server network adapters 210 and 212 may be unchanged to those of FIG. 2. The hypervisor 308 may fulfill typical tasks required to enable virtual servers and operating applications in those virtual servers. Instead of only one storage device 218, multiple storage devices 218—also of different types, e.g. disks and/or tapes, etc.—may be possible.

In addition, also ports 360, 362, 364 and 366 of the storage system network adapters 220, 222 may be shown. They may be the equivalents to the ports 352, 354, 356 and 358 of the server network adapters 210, 212.

Also shown in FIG. 3 is a port workload controller 370. In one embodiment—as shown here—the port workload controller 370 may be part of the hypervisor. In another embodiment, the port workload controller 370 may be working side by side with the hypervisor. Fundamentally, there may not be a difference. However, an implementation of the port workload controller 370 as part of the hypervisor may technically be more elegant.

The port workload controller 370 may control that a storage access path from one of the applications 204, 340, 206, 342 via various elements may not be used with mixed workloads. In particular, the port workload controller 370 may ensure that the physical ports 352, 354, 356 and 358 of the server network adapters 210, 212 and the physical ports 360, 362, 364, 366 of the storage system network adapters 220 and 222 may only be used for equal workloads, i.e., 'random' or 'sequential'. A mixture of workload types may—as explained above—have a negative impact on the performance of the access command execution.

The following table may illustrate some general examples of different storage access paths:

| path number | server port | storage port | disk |
|---|---|---|---|
| 1 | 352 | 360 | 228 |
| 2 | 354 | 362 | 228 |
| 3 | 356 | 364 | 228 |
| 4 | 358 | 366 | 228 |

It may also be noted that a mapping between virtual port 348, 350 and physical ports 352, 354, 356, 358 may not be relevant to characterize an I/O path. The mapping may not be visible to a virtual server 344, 346. Also a sharing of physical server ports 353, 354, 356, 358 between multiple virtual servers 344, 346 may be transparent to virtual servers 344, 346.

The port workload controller 370 may keep an inventory of all available ports and the permitted workload type, as exemplary shown in the following table:

| server port | permitted workload |
|---|---|
| 352 | offline |
| 354 | sequential |
| 356 | random |
| 358 | random disabled |

The following workload types and the following related workload states may be used:

Offline to indicate that a port may be currently down e.g. due to an error or scheduled maintenance;

Random to indicate that a port may currently be used for random I/O;

Random disabled to indicate that a port may currently be used for random I/O and that no further new I/O requests to this port may be allowed;

Sequential to indicate that a port may currently be used for sequential I/O;

Sequential disabled to indicate that a port may currently be used for sequential I/O and that no further new I/O requests to this port may be allowed.

Additional workload types may be added whilst the basic concept of this invention disclosure remains unchanged.

A combination of general examples of different storage access paths and workload types may result in the following example of I/O paths to disk 228—in FIG. 3—that may be controlled by port workload controller 370.

| path number | server port | storage port | disk | permitted workload |
|---|---|---|---|---|
| 1 | 352 | 360 | 228 | offline |
| 2 | 354 | 362 | 228 | sequential |
| 3 | 356 | 364 | 228 | random |
| 4 | 358 | 366 | 228 | random disabled |

A boot process of the physical server 202 may need to be extended for building the above table before the virtual servers 344, 346 may be started.

Figure 4:
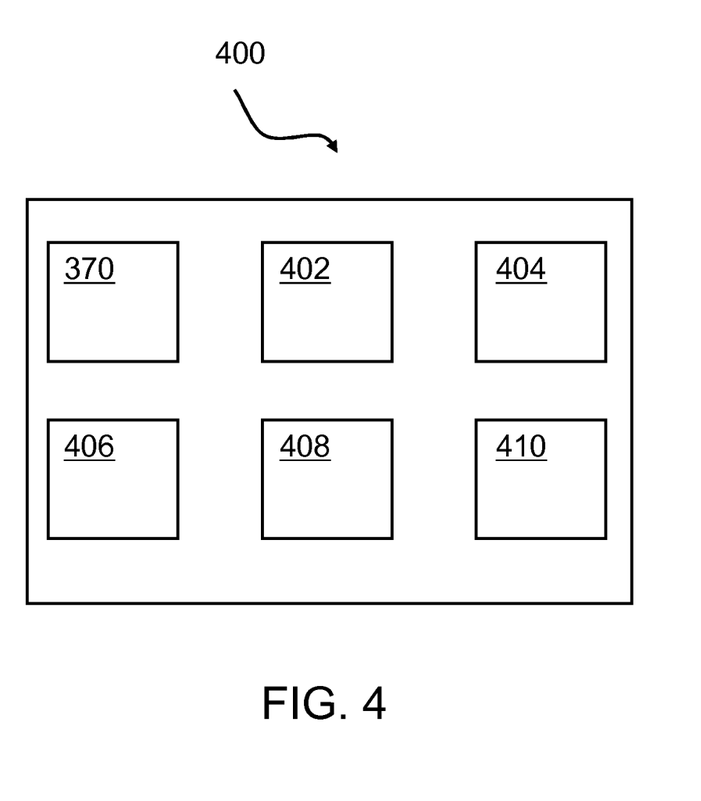
FIG. 4 illustrates an embodiment of a path selection engine.

FIG. 4 may illustrate an embodiment of a storage path selection engine 400 between an application 204, 340, 206, 342 and a storage device 228, 230, 232. The storage path selection engine 400 may comprise a port workload controller 370 being adapted to control workload types of ports 352, 354, 356, 358 for an access to a storage device 228, 230, 232 and a receiving unit 402 adapted to receive a storage access command by the port workload controller 370 from the application 204, 340, 206, 342 being executed on a virtual server 344, 346 on a physical server 202. The storage path selection engine 400 may also comprise a first determination unit 404 adapted to determine the workload type related to the storage access command, and a second determination unit 406 adapted to determine a plurality of storage access paths between the application 204, 340, 206, 342 and the storage device 228, 230, 232 having the same workload type as the determined workload type related to the storage access command, using storage access path mapping data controlled by the port workload controller 370. Moreover, the storage path selection engine may comprise a selection unit 408 adapted to select a selected storage access path out of the determined storage access paths having the least utilization and an accessing unit 410 adapted to access the storage device 228, 230, 232 via the selected storage access path.

The workload profile of the virtual servers 344, 346 may typically change over time and consequently, there may be a requirement also to change the workload types of the server ports 352, 354, 356, 358. They may be changed from random to sequential or vice versa. This may be achieved by a two phase procedure wherein a server port, e.g., 352 may first be disabled for the current workload type described below and then enabled for the other workload type. This may be described by the flowchart shown in FIG. 6.

It may also be noted that a port may be block for an access of a planned workload type that does not match a configured workload type for the specific port.

Figure 6:
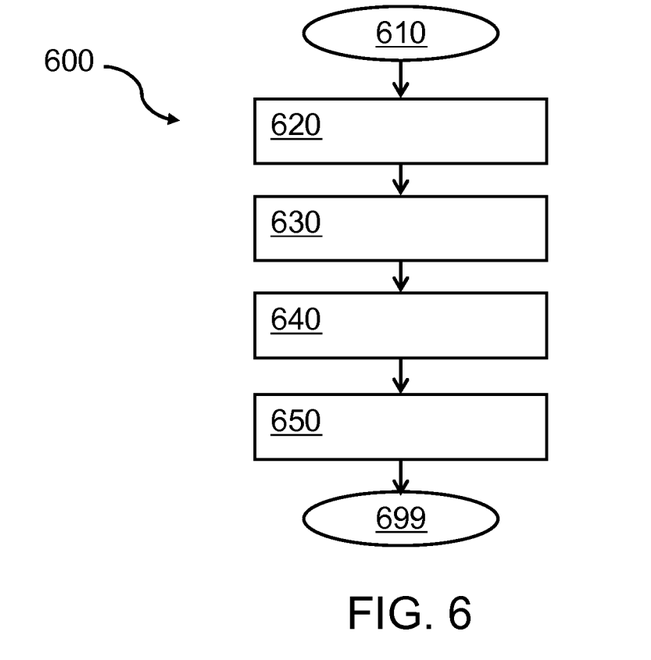
FIG. 6 may illustrate a process for disabling a server port.

FIG. 6 may illustrate a process 600 for disabling a server port e.g., 352 and all respective paths. The process 600 may be initiated by a workload port workload controller, which may compare current aggregated throughput and may reconfigure the workload type of a physical port 352 as needed. This may be initiated before maintenance tasks like updating of firmware of server network adapter 210, removing or replacing server network adapter 210, or reconfiguring network 214, 216.

The process 600 may comprise the following steps: The process may start at 610. At 620, a current status (described above) of a port, e.g. 352, to be disabled may be determined (this may be 'random' or 'sequential') and flagged to be disabled ('random disabled' or 'sequential disabled) in a corresponding table. This may indicate that already issued I/O requests may be allowed to be completed, but no further new I/O requests may be accepted.

At 630, the port workload controller 370 of the physical server 202 may signal to a device driver running as part of an operating system running in the virtual server 344, 346 that the port status may have been changed to 'disabled'. Each device driver may determine all paths which contain port 352 currently being disabled and may set their status to offline (not 'random disabled' or 'sequential disabled') indicating that these paths may not be selected for new I/O requests.

At 640, it may be waited for a grace period to allow a completion of already issued I/O requests. At 650, the Hypervisor 308 may set a status of server port 352 as being disabled to offline in the corresponding table. In the preferred embodiment, from now on, the port workload controller 370 of hypervisor 308 may request new I/O requests via port 352 which was set offline before. At 699 the process 600 may end.

Figure 7:
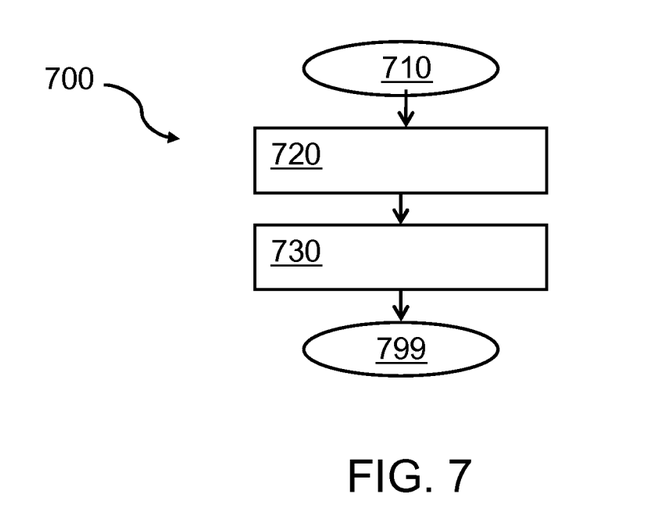
FIG. 7 may illustrate a process of configuration of a workload type for a port.

FIG. 7 may illustrate a process 700 of configuration of a workload type for a port, e.g., port 352 and all dependent paths. The process may start at 710. At 720, a current status (described above) of the port to be configured for a specific workload type may be set (e.g., 'random' or 'sequential'). There may be no grace period required, because there may be workload on this port, which may need to be phased out. All new I/O requests, which match the configured workload type, may be accepted and processed. New I/O requests, which may not match the permitted workload type, may be blocked (see above). At 730, the port workload controller 308 of the physical server 202 may signal to the device drivers of each virtual server 344, 346 that the port status may have been set to a specific workload type. Each device driver may determine all paths which contain port 352 currently being configured and may set their status in the respective table to the respective workload type indicating that these paths may now be selected to issue I/O commands of the permitted workload type. The process may end at 799.

Figure 5:
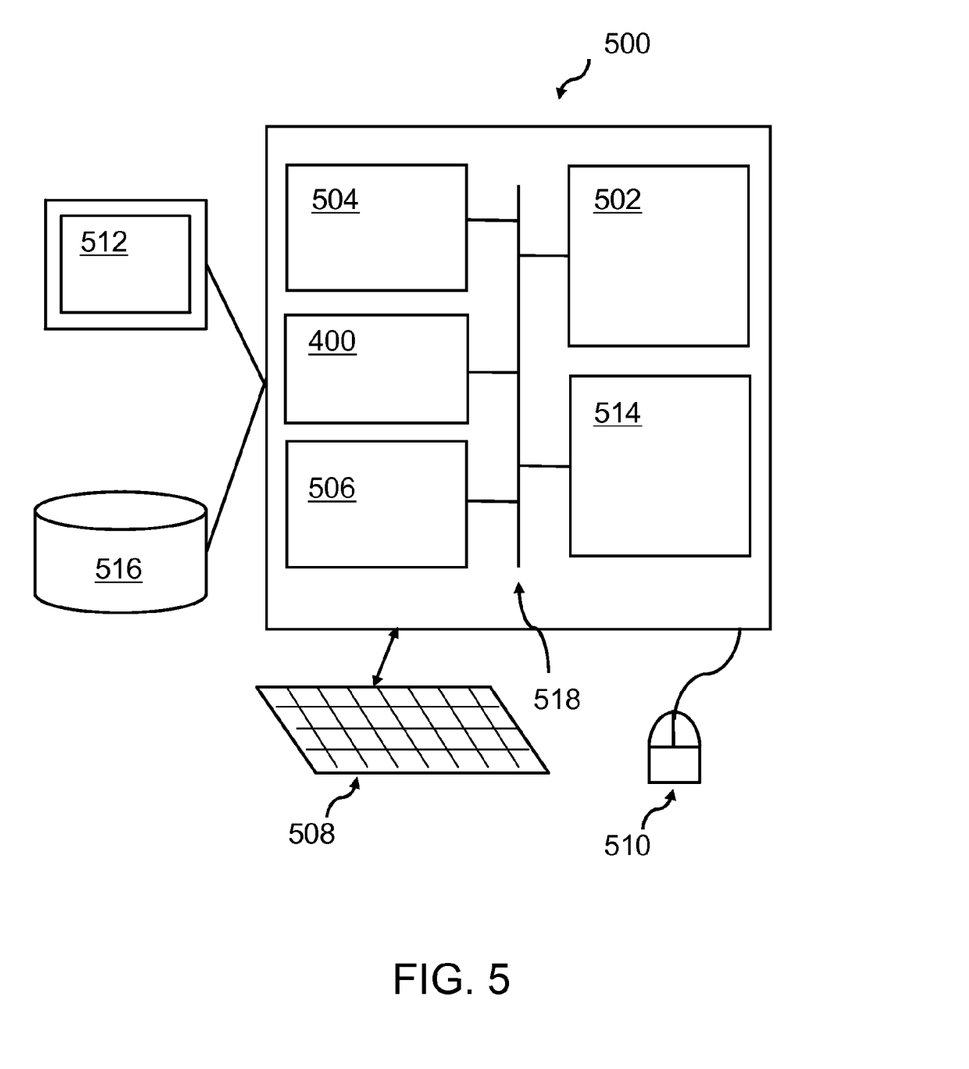
FIG. 5 shows a computer system comprising the path selection engine.

Embodiments of the invention may partly be implemented on virtually any type of computer, regardless of the platform being used suitable for storing and/or executing program code. For example, as shown in FIG. 5, a computer system 500, which may be equivalent to the above mentioned physical server 202, may include one or more processor(s) 502 with one or more cores per processor, associated memory elements 504, an internal storage device 506 (e.g., a hard disk, an optical drive such as a compact disk drive or digital video disk (DVD) drive, a flash memory stick, etc.), and numerous other elements and functionalities typical of today's computers (not shown). The memory elements 504 may include a main memory, employed during actual execution of the program code, and a cache memory, which provides temporary storage for at least some program code or data in order to reduce the number of times, code must be retrieved from external bulk storage 516 for execution. Elements inside the computer 500 may be linked together by means of a bus system 518 with corresponding adapters. Additionally, a storage path selection engine 400 may be attached to the bus system 518.

The computer system 500 may also include input means, such as a keyboard 508, a mouse 510, or a microphone (not shown). Furthermore, the computer 500 may include output means, such as a monitor 512 [e.g., a liquid crystal display (LCD), a plasma display, a light emitting diode display (LED), or a cathode ray tube (CRT) monitor]. The computer system 500 may be connected to a network (e.g., a local area network (LAN), a wide area network (WAN), such as the Internet, or any other similar type of network, including wireless networks via a server network adapter 514 and/or storage system 218. This may allow a coupling to other computer systems. Those, skilled in the art will appreciate that many different types of computer systems do exist, and the aforementioned input and output means may take other forms. Generally speaking, the computer system 500 may include at least the minimal processing, input and/or output means, and necessary to practice embodiments of the invention.

Further, those skilled in the art will appreciate that one or more elements of the aforementioned computer system 500 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

While the invention has been described with respect to a limited number of embodiments, those skilled in the art, benefiting from this disclosure, will appreciate that other embodiments may be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for an Input/Output (I/O) path selection based on workload types by a processor device in a computing environment, the method comprising:
    providing a port workload controller being adapted to control the workload types of a plurality of ports for accessing a storage device;
    receiving a storage access command by the port workload controller from an application being executed on at least one virtual server on a physical server;
    determining the workload types related to the storage access command;
    determining a plurality of storage access paths between the application and the storage device having the same workload types as the determined workload types related to the storage access command, wherein storage access paths mapping data that is controlled by the port workload controller is used;
    selecting a selected one of the plurality of storage access paths out of the determined one of the plurality of storage access paths having the least utilization; and
    accessing the storage device via the selected one of the plurality of storage access paths.

2. The method of claim 1, wherein a hypervisor being executed on the physical server comprises the port workload controller.

3. The method of claim 1, wherein the plurality of storage access paths comprise at least one of a virtual port of the at least one virtual server, a server network controller, a network, a storage network controller, and a storage controller.

4. The method of claim 1, further including maintaining an index of a plurality of server network controllers by the port workload controller.

5. The method of claim 1, further including signalling permitted workload types to device drivers of the at least one virtual server.

6. The method of claim 5, further including blocking an access to a port of at least one of a plurality of server network controllers for the selected one of the plurality of storage access paths if the workload types do not match the permitted workload types.

7. The method of claim 6, further including synchronizing updates of the permitted workload types for the port of the at least one of a plurality of server network controllers, the synchronization including at least one of:
    setting the permitted workload types of the port to a disabled-pending status in the storage access paths mapping data,
    signalling the disabled-pending status to the device drivers of each of the at least one virtual server,
    waiting for a predetermined time to allow issued storage device access commands to complete,
    writing a new workload type for a port to the storage access paths mapping data, and
    signalling the writing of the new workload type to the device drivers of each of the at least one virtual server.

8. A system for an Input/Output (I/O) path selection based on workload types in a computing environment, comprising:
    a port workload controller adapted to control the workload types of a plurality of ports for accessing a storage device
    a storage path selection engine in communication with the port workload controller, wherein the storage path selection engine is adapted for selecting an Input/Output (I/O) path selection based on workload types,
    a receiving unit in communication with the port workload controller and the storage path selection engine, wherein the receiving unit is adapted for receiving a storage access command by the port workload controller from an application being executed on at least one virtual server on a physical server,
    a first determination unit in communication with the port workload controller, the storage path selection engine, and the receiving unit, wherein the first determination unit is adapted for determining the workload types related to the storage access command
    a second determination unit in communication with the port workload controller, the storage path selection engine, and the first determination unit, wherein the second determining unit is adapted for determining a plurality of storage access paths between the application and the storage device having the same workload types as the determined workload types related to the storage access command, wherein storage access paths mapping data that is controlled by the port workload controller is used,
    a selection unit in communication with the port workload controller, the storage path selection engine, the first determination unit, and the second determination unit, wherein the selection unit is adapted for selecting a selected one of the plurality of storage access paths out of the determined one of the plurality of storage access paths having the least utilization
    a accessing unit in communication with the port workload controller, the storage path selection engine, the first determination unit, the second determination unit, and the selection unit, wherein the accessing unit is adapted for accessing the storage device via the selected one of the plurality of storage access paths
    at least one processor device in communication with the port workload controller, the storage path selection engine, the first determination unit, the second determination unit, the selection unit, the accessing unit, and the at least one virtual server on the physical server.

9. The system of claim 8, further including a hypervisor in communication with the processor, wherein the hypervisor is further adapted for being executed on the physical server and comprises the port workload controller.

10. The system of claim 8, wherein the plurality of storage access paths comprise at least one of a virtual port of the at least one virtual server, a server network controller, a network, a storage network controller, and a storage controller.

11. The system of claim 8, wherein the processor device is further adapted for maintaining an index of a plurality of server network controllers by the port workload controller.

12. The system of claim 8, wherein the processor device is further adapted for signalling permitted workload types to device drivers of the at least one virtual server.

13. The system of claim 12, wherein the processor device is further adapted for blocking an access to a port of at least one of a plurality of server network controllers for the selected one of the plurality of storage access paths if the workload types do not match the permitted workload types.

14. The system of claim 13, wherein the processor device is further adapted for synchronizing updates of the permitted workload types for the port of the at least one of a plurality of server network controllers, the synchronization including at least one of:
- setting the permitted workload types of the port to a disabled-pending status in the storage access paths mapping data,
- signalling the disabled-pending status to the device drivers of each of the at least one virtual server,
- waiting for a predetermined time to allow issued storage device access commands to complete,
- writing a new workload type for a port to the storage access paths mapping data, and
- signalling the writing of the new workload type to the device drivers of each of the at least one virtual server.

15. A computer program product for an Input/Output (I/O) path selection based on workload types by a processor device, the computer program product comprising a non-transitory computer-readable storage medium having computer-readable program code portions stored therein, the computer-readable program code portions comprising:
- a first executable portion for providing a port workload controller being adapted to control the workload types of a plurality of ports for accessing a storage device;
- a second executable portion for receiving a storage access command by the port workload controller from an application being executed on at least one virtual server on a physical server;
- a third executable portion for determining the workload types related to the storage access command;
- a fourth executable portion for determining a plurality of storage access paths between the application and the storage device having the same workload types as the determined workload types related to the storage access command, wherein storage access paths mapping data that is controlled by the port workload controller is used;
- a fifth executable portion for selecting a selected one of the plurality of storage access paths out of the determined one of the plurality of storage access paths having the least utilization; and
- a sixth executable portion for accessing the storage device via the selected one of the plurality of storage access paths.

16. The computer program product of claim 15, wherein a hypervisor being executed on the physical server comprises the port workload controller.

17. The computer program product of claim 15, wherein the plurality of storage access paths comprise at least one of a virtual port of the at least one virtual server, a server network controller, a network, a storage network controller, and a storage controller.

18. The computer program product of claim 15, further including a seventh executable portion for maintaining an index of a plurality of server network controllers by the port workload controller.

19. The computer program product of claim 15, further including a seventh executable portion for signalling permitted workload types to device drivers of the at least one virtual server.

20. The computer program product of claim 19, further including an eighth executable portion for blocking an access to a port of at least one of a plurality of server network controllers for the selected one of the plurality of storage access paths if the workload types do not match the permitted workload types.

21. The computer program product of claim 20, further including a ninth executable portion for synchronizing updates of the permitted workload types for the port of the at least one of a plurality of server network controllers, the synchronization including at least one of:
- setting the permitted workload types of the port to a disabled-pending status in the storage access paths mapping data,
- signalling the disabled-pending status to the device drivers of each of the at least one virtual server,
- waiting for a predetermined time to allow issued storage device access commands to complete,
- writing a new workload type for a port to the storage access paths mapping data, and
- signalling the writing of the new workload type to the device drivers of each of the at least one virtual server.

* * * * *